(12) United States Patent
Jones (10) Patent No.: US 11,815,403 B2
(45) Date of Patent: Nov. 14, 2023

(54) SPECIALTY CONTROL THERMOCOUPLE FOR VACUUM HEAT TREAT FURNACES

(71) Applicant: William R. Jones, Telford, PA (US)

(72) Inventor: William R. Jones, Telford, PA (US)

(73) Assignee: SOLAR MANUFACTURING, INC., Sellersville, PA (US)

( * ) Notice: Subject to any disclaimer, the term of this patent is extended or adjusted under 35 U.S.C. 154(b) by 0 days.

(21) Appl. No.: 16/873,814

(22) Filed: Jul. 16, 2020

(65) Prior Publication Data
US 2022/0099502 A1     Mar. 31, 2022

(51) Int. Cl.
*G01K 7/06*     (2006.01)
*F27B 5/18*     (2006.01)

(52) U.S. Cl.
CPC . *G01K 7/06* (2013.01); *F27B 5/18* (2013.01)

(58) Field of Classification Search
CPC ... G01K 7/06; G01K 1/14; G01K 7/04; F27B 5/18
See application file for complete search history.

(56) References Cited

U.S. PATENT DOCUMENTS

| | | | |
|---|---|---|---|
| 2,820,839 A | 7/1953 | Schunke | |
| 2,948,766 A | 4/1956 | Schneider et al. | |
| 3,935,032 A | 1/1976 | Brandeberry et al. | |
| 4,021,268 A * | 5/1977 | Smith | G01K 1/16 374/E1.021 |
| 4,060,095 A * | 11/1977 | Kurita | G01K 1/12 374/E1.016 |
| 4,225,744 A | 9/1980 | Jones | |
| 4,430,518 A | 2/1984 | Nakajima et al. | |
| 4,435,092 A | 3/1984 | Iuchi | |
| 6,536,950 B1 * | 3/2003 | Green | G01K 1/10 374/179 |
| 9,267,850 B2 | 2/2016 | Aggarwal et al. | |
| 2008/0232428 A1* | 9/2008 | Ripley | G01K 1/08 374/E1.016 |
| 2013/0243036 A1* | 9/2013 | Scervini | H01L 35/20 374/179 |
| 2016/0178447 A1* | 6/2016 | Ito | G01K 1/08 374/179 |

FOREIGN PATENT DOCUMENTS

DE     202013100708 U1 *  5/2013    ............ G01K 1/12

* cited by examiner

*Primary Examiner* — Harshad R Patel
(74) *Attorney, Agent, or Firm* — Aaron Nerenberg (57) ABSTRACT

A low thermal conductivity fixed thermocouple with a heat sink package specifically designed for electrically heated vacuum furnaces having an overall cylindrical hot zone diameter of 36 inches or less, and preferably containing all metal reflective radiation shields or graphite felt insulation packages that experience high conductive losses in the low temperature ranges during vacuum heating which result in large discrepancies between the furnace temperature readings and the actual workload temperature.

11 Claims, 5 Drawing Sheets

VIEW 'A'-'A'
FIG. D

VIEW 'B'-'B'
FIG. E

SPECIALTY CONTROL THERMOCOUPLE FOR VACUUM HEAT TREAT FURNACES

BACKGROUND OF THE INVENTION

1. Field of the Invention

The present invention relates to a fixed thermocouple with low thermal conductivity combined with an all metal heat sink shield package designed to improve temperature control in water-cooled, electrically heated vacuum furnaces with a heating element diameter of 36 inches or less.

2. Description of the Prior Art

With the increased usage of specialty alloys such as titanium, niobium, tantalum and certain stainless steels for aerospace and medical products, the need for using an all-metal hot zone has increased. All-metal hot zones provide a much cleaner atmosphere and can pump down to much deeper vacuum levels more rapidly than the more robust all-graphite hot zone. [T. Jones and R. Fradette, "Residual Gas Analyzer Determines Difference in Graphite and All-Metal Hot Zone Vacuum Operation," Advanced Materials and Processes, 173(6): 40-44] Since the all-metal design uses metal shielding, rather than the more insulating graphite felt design, it does suffer from higher radiation losses, which are a trade-off for the reduction of unwanted residual gasses. R. Fradette, "Understanding Power Losses in Vacuum Furnaces," Solar Manufacturing, Souderton, PA www.solarmfg.com Although the detailed description of the present invention shows and describes an all-metal hot zone, it should be understood that the temperature anomaly similarly occurs to a lesser extent in vacuum furnaces with less than 36 inch diameter heating elements all-graphite insulated hot zones. Accordingly, the present invention is intended to include an all-graphite hot zone design.

The aerospace industry, and especially the metal industry, require furnaces to accommodate the number and size of the parts to be heat treated, which can be different than typical steel manufactured parts. Given the expense of all-metal hot zones, the overall cost to build and maintain this different furnace design also has an economic consideration that is important to the industry. For production of medical and aerospace parts, these furnaces having cylindrical hot zones less than 36 inch diameter failed thermal uniformity surveys (TUS) based on AMS 2750E due to large temperature discrepancies between the furnace control thermocouple readings and the workload thermocouple readings specifications for low temperature processing such as tempering, annealing and aging. A solution to the problem required a redesign of the control thermocouple and the addition of radiation shields at the outer portion of the hot zone ring that connects the furnace control thermocouple to the furnace chamber cold wall. The engineering thought process for the improvement and resultant TUS data is presented herein.

Cylindrical vacuum furnaces with a heating element diameter of 36 inches or less suffer from a substantial, unacceptable temperature difference between the work thermocouple temperature reading measurement and the furnace control thermocouple at temperature ranges throughout the full range of 900° F.-1500° F., most dramatically in the 900° F.-1200° F. range. This temperature anomaly between the furnace control thermocouple, not in contact with the workload, and the workload thermocouple which is embedded in the workload occurs in both the all-metal, specifically molybdenum radiation shielded hot zones, and the all-graphite insulated hot zones. In the lower temperature ranges, the furnace control thermocouple reads cooler than the set process temperature and also the workload thermocouples. As a result, the automated furnace power source continues input energy to the furnace heating elements until the furnace control thermocouple reaches the set process temperature. This situation leads to the workload temperature exceeding the process temperature required by the customer, in many instances as much as 40° F., resulting in overheating of the parts, and in some cases catastrophic property changes resulting in parts that had to be scrapped. Such temperature discrepancies result in noncompliance with aerospace specifications. In order to avoid these discrepancies, the operator must manually reduce the control temperature setpoint to avoid the workload temperature running above the acceptable process temperature setpoint. Unfortunately, this methodology is no longer acceptable in order for the heat treat facility to meet such accreditations as NADCAP, MEDACRED, ISO9001:2015 and AS9100D. Therefore, a solution to reduce these temperature differentials had to be found. The present invention solves this problem for the all-metal hot zones and all graphite hot zones described above.

Each heat treating furnace is classified according to the temperature uniformity between the furnace control thermocouple and the actual workload thermocouples. The reporting of this accuracy is referred to as TUS and is a controlled calibration methodology, using established procedures that fully meet the requirements of the Aerospace Material Specification—AMS 2750E—which is defined by the Society of Automotive Engineers (SAE). This Specification has changed throughout the years as the aerospace and medical industries' requirements have become more stringent with regard to specialty alloy mechanical properties.

According to the most updated standard (AMS 2750E), based on the temperature tolerances within the specified locations within the hot zone, a heat treating furnace will fall into one of six classes as follows:

Class 1: ±5° F.; Class 2: ±10° F.; Class 3: ±15° F.; Class 4: ±20° F.; Class 5: ±25° F.; Class 6: ±50° F.

For most aerospace and medical heat treatment processes, the furnaces must be Class 1 or Class 2. In standard sized vacuum furnaces, the current 'Type S' control thermocouple works well and provides acceptable comparative temperature readings as the work thermocouples in order to meet the AMS 2750E specification throughout the temperature range between room temperature and 2200° F.

However, it has been found that the standard furnace control 'Type S' thermocouples, when used in the all-metal and graphite insulated furnace hot zones less than 36 inches in diameter, were unable to fall within the prescribed temperature tolerances to meet the Class 1 or Class 2 requirements throughout the full working temperature range of the furnace. Recent needs for all-metal vacuum furnaces with a working hot zone of 24×24×36 inches exhibit extremely large temperature tolerances (±range) at furnace temperatures below 1200° F. (649° C.), and could not even pass the AMS 2750E temperature uniformity surveys without a workload in the furnace. For production of medical and aerospace parts, these furnaces fall outside the AMS 2750E specifications for such processes as tempering, annealing and aging. A solution to the problem required a redesign of the control thermocouple for all hot zones. In the case of the all-metal hot zone, an additional shielding package located on the cold wall side of the hot zone steel support outer ring solved the problem. The engineering thought process for the improvement and resultant TUS data are presented, with Example 1 (below) showing the old design data and Example 2 (below) showing the data with both the new thermocouple and shield design for an all-metal hot zone. The data for the graphite-lined hot zone is not separately presented, but the use of the new thermocouple alone in the graphite type vacuum furnaces, as described, provides the same correction to the TUS discrepancy and thus is included as part of and within the scope of the present invention.

In heat treating furnaces as currently designed, when heating in full vacuum, the two main heat transfer modes are radiation and conduction. The observed temperature variation between the fixed furnace thermocouple not in direct contact with the workload and the flexible workload thermocouple embedded in the parts in a vacuum furnace is the result of a difference in heat transfer modes that affect each type of thermocouple in the furnace. Although both types of thermocouples are heated via radiation in the furnace, they also experience conductive heat transfer, as both types of thermocouples are in contact with metals within the furnace chamber. Since radiative heating in vacuum is inefficient below 1200° F. (649° C.), any conductive heat transfer has a large effect on heat losses in the lower temperature range. A portion of the furnace thermocouple also passes through a water-cooled cold wall, whereas the workload thermocouples do not. Since the alumina tube/sheath surrounding the thermocouple wires of the furnace thermocouple is in direct contact with the cold wall of the furnace chamber, it will suffer conductive heat losses that are magnified in the lower temperature range in these vacuum furnaces.

Figure 5:
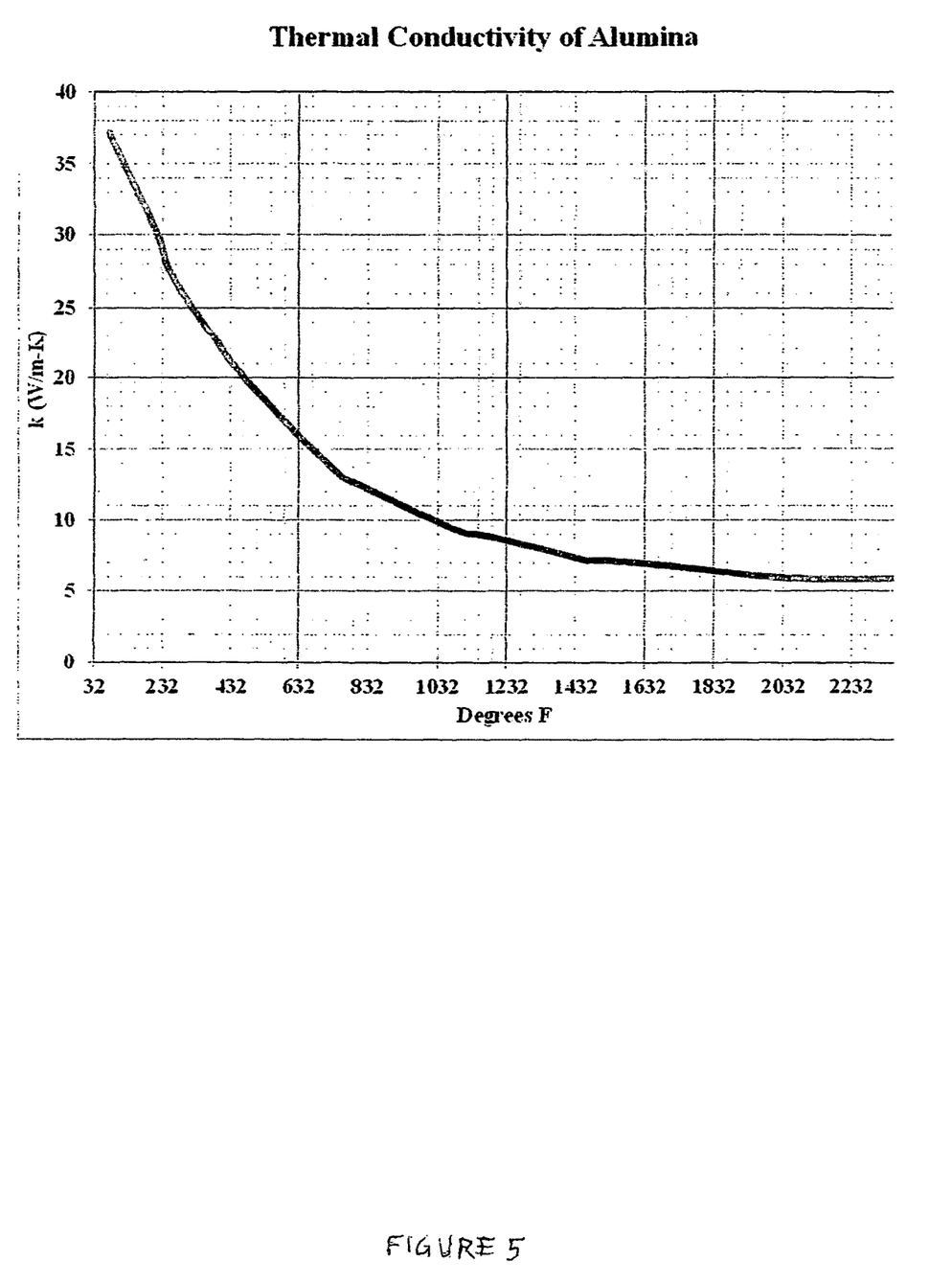
FIG. 5 is a graph showing the thermal conductivity curve of alumina.

It was found that the heavy cross-section alumina protective tube, typically used in all vacuum furnace thermocouples due to their rugged structure required to withstand high speed rapid heating and cooling of the high pressure, gas quenching furnace, was the source of heat loss via conduction to the cold wall in these furnaces. This is due to the variation of the thermal conductivity of pure alumina with temperature. As shown in FIG. 5, there is a significant increase in the thermal conductivity of 99.5% pure alumina as the temperature drops below 1200° F. (649° C.).

Since the furnace control thermocouple is connected to the outer portion of the hot zone ring, which is in close proximity to the water-cooled chamber wall, loss of heat through conduction within the alumina tube can and does result in a decrease in the furnace control thermocouple reading compared to the workload thermocouples. These thermocouples are in the interior of the hot zone and are receiving heat through radiation from the furnace heating elements, the heat shields and through conduction from the parts that are being heated.

Any heat loss from the furnace control thermocouple tip in the furnace to the cold wall produces a low temperature reading for the furnace. This low reading sends information to the furnace control module causing it to continually input electrical energy to the heating elements, resulting in sustained radiative heat transfer to the workload and leading to a significant discrepancy between the temperature of the workload and the furnace hot zone. When a temperature uniformity survey (TUS) indicates a major temperature discrepancy and non-conformance of the heat treat cycle, which can lead to possible damage of the parts themselves, this results in economic loss for both the heat treat company and the customer. The ability to tighten the temperature reading for the furnace hot zone and the workload is always key to operating a vacuum furnace with automatic controls that do not require a human interface.

The present invention reduces the conductive heat losses within the solid alumina sheathed furnace thermocouple by reducing the mass density and surface area of the alumina sheath. The basis for explaining the present invention can be explained mathematically by the conductive heat transfer Equation 1, where the key features of the Sheath L and A have a significant effect on on conductive heat transfer within a body.

$$Q_c = kA/L(T_{hot} - T_{cold})$$  Equation 1:

where
$T_{hot}$ ¬ Temperature of the Hot end of TC
$T_{cold}$ ¬ Temperature of the Cold end of TC
$Q_c$ ¬ Conductive Heat Loss
A ¬ Surface Area of the Alumina Sheath
L ¬ Length of the Sheath Based on Measurement of Points for $T_{hot}$ and $T_{cold}$ The redesign of the alumina sheath reduces the surface area of the sheath (A) in Equation 1. By decreasing the overall mass of alumina in the thermocouple, the conductive heat losses between the hot tip and cold end of the furnace control thermocouple decreases. This results in a more accurate temperature comparison between the furnace control thermocouple and the workload thermocouples in both the all-graphite hot zone and the all-metal hot zone vacuum furnaces with a heating element diameter of less than 36 inches.

The use of the new furnace control thermocouple alone provided the needed correction for the all-graphite insulated vacuum furnaces with a less than 36 inch heating element diameter in order to meet industry standards for Class 1 and Class 2 furnaces. The all-metal hot zone with a less than 36 inch heating element diameter improved somewhat by using the present invention furnace control thermocouple alone, but it did not correct enough to allow these all-metal hot zones to fully meet required temperature limitations to satisfy the Class 1 or Class 2 designation. The key feature of the new furnace control thermocouple according to the present invention has a much thinner alumina sheath tube with reduced mass density in order to decrease conductive heat losses.

In the case of the all-metal hot zone with a heating element diameter less than 36 inches, a secondary solution to further decrease conductive heat loss Q from Equation 1 was required. This secondary solution, as described in the detailed description of the invention, when used with the new thermocouple according to the present invention, utilizes a heat sink on the cold side of the hot zone to effectively increase L in Equation 1 and further correct the temperature variation allowing the graphite or all-metal vacuum furnaces to meet the Class 1 and Class 2 designation by the industry. The additional shields placed on the cold side of the hot zone ring will be described and serves two functions. It increases the thermal sink by trapping any heat loss along the length of the ceramic sheath before reaching the cold wall, thus increasing the effective length (L) in Equation 1 and decreasing conductive losses ($Q_c$).

According to the present invention, the new furnace control thermocouple has a ceramic tube or sheath, preferably made of pure alumina, with an outer diameter decreased from 5/16 inch to 3/16 inch. This design change significantly reduces the cross-sectional area and mass of the alumina tube and thus decreases the thermal conductance of the tube to the cold wall. First, the thermocouple wires have been separated with uniquely stacked inner ceramics to further reduce the thermocouple mass and the heat conductive path of the alumina to the cold wall. Second, the double bore sheath design was removed and replaced with a single bore design, and only one leg of the thermocouple wire junction is placed in the single bore while the other thermocouple wire is was left free within the thinner outer shell sheath/tube. The new thermocouple design with reduced alumina mass effectively minimizes the conductive losses between the thermocouple and the cold wall of the furnace due to the higher thermal conductivity of the alumina at the reduced operating temperatures. The new sheath/tube design reduces the surface area of alumina in contact with the thermocouple wires. For the all metal hot zones, it was found necessary to also effectively increase L in Equation 1. The best solution is to add heat shields as a heat sink onto the outside hot zone ring where the control thermocouple is located within the cold space in the furnace to act as heat sinks in order to minimize radiative and conductive heat losses from the all-metal hot zone. The heat is reflected towards the outer ring and the alumina sheath of the thermocouple. This reflective energy keeps the alumina sheath, hotter than the unprotected sheath, as previously used, and reduces the conductive heat transfer from the hot tip to the cold tip within the alumina sheath by effectively increasing L in Equation 1. Each of these changes helps to reduce conductive and radiative losses, reducing the TUS discrepancy at low temperatures and providing a more uniform all metal hot zone that can meet the Class 1 classification for a vacuum heat treat furnace.

Thermocouple sensors for heat treating metals have long been in use. The ASM Handbook, volume 4B, is a good reference for the typical furnace control thermocouple design used in both atmosphere and vacuum furnaces. U.S. Pat. No. 4,225,744 to William R. Jones et al. teaches a design of a fixed thermocouple for vacuum electric furnaces. The thermocouple, as taught in the patent, is suitable for nitride and carburized case formation in such furnaces. Although this patent teaches specifically for ion plasma furnaces, there are some similarities to the furnace control thermocouple design used in many prior art furnaces within the industry. There is an outer ceramic tube that serves as a shield which is exposed to the furnace gasses. The thermocouple wires are shielded inside the outer tube and reside within separate ceramic tubing within the outer tube. The two wires are welded together at their ends which sit within the outer tube, but are outside their respective inner tubes.

Other patents that describe such a fixed thermocouple can be found in U.S. Pat. No. 9,267,850 and the other patents cited therein. Many of the prior art thermocouples were designed for aggressive environments such as molten metals. Most notably, all control thermocouples utilize two wires that must be insulated or protected from the heated environment to ensure proper temperature measurement and uniformity. Each design is an improvement on prior art designs as the science of temperature measurement advanced. Some additional U.S. prior art patents include: U.S. Pat. Nos. 2,820,839; 3,935,032; 4,435,092; 4,430,518; 2,948,766; and 4,060,095. Most notably, the teaching of Nakajima et al. (U.S. Pat. No. 4,430,518) resembles the present invention in the inner design of the thermocouple. In Nakajima a protecting tube comprising an outer shell made of tubular molded ceramic body surrounding a molded sheath tube with inner platinum/platinum-rhodium thermocouples, where one set of wires is inserted in a series of ceramic tubes, all of which is connected to a measuring device. The present invention is an improvement of the design taught by Nakajima et al., as their teaching was designed for corrosion resistance at high temperatures of the outer ceramic tube to withstand thermal shock at these high temperatures for insertion into molten metals. The multiplicity of ceramic tubing, boron nitride over a ceramic sheath with an internal ceramic tube, would suffer from the same temperature inaccuracies of the standard dual bore arrangement described in the references.

All of the prior art references differ from the present invention in that they were trying to find means to control the high temperature range of furnaces and molten metal processes. The present invention addresses a new need to incorporate a fixed furnace thermocouple that can accurately control the energy input to the furnace at all temperature ranges in a vacuum atmosphere while ensuring that the actual workload temperature being measured with a different set of thermocouples falls within a standard set temperature range specified by the aerospace and medical industries.

The solution to the current problem necessitated by new standards affirmed by AMEC 2750E resulted in the design of the present invention and is considered to be an improvement over prior art designs which is necessary to meet the narrow specification for small all-metal vacuum furnace hot zones.

SUMMARY OF THE INVENTION

In a cold wall vacuum furnace hot zone for heat treating metal parts, a control thermocouple assembly for measuring the temperature in the hot zone containing continuous sheath means having an elongated longitudinal axis and a measuring tip located at a distal end of the sheath means, the sheath means having an outside diameter no more than 3/16 inch and being made from a ceramic material, the sheath means further having an inner single bore ceramic tube containing a first thermocouple wire therein, and a second tube having a single bore containing a second thermocouple wire therein, the first and second wires being separated from each other within the sheath means, and being joined together at the longitudinal tip of the sheath means to form a thermocouple junction therebetween, and reflection shield means operatively connected to the outer face of the furnace hot zone and located in proximity to the thermocouple assembly sheath means.

BRIEF DESCRIPTION OF THE DRAWINGS

FIG. 4 is a cross-sectional view showing the cutaways 'A'-'A' of FIGS. 1 and 'B'-'B' of FIGS. 2 and 3.

DETAILED DESCRIPTION OF THE INVENTION

Figure 1:
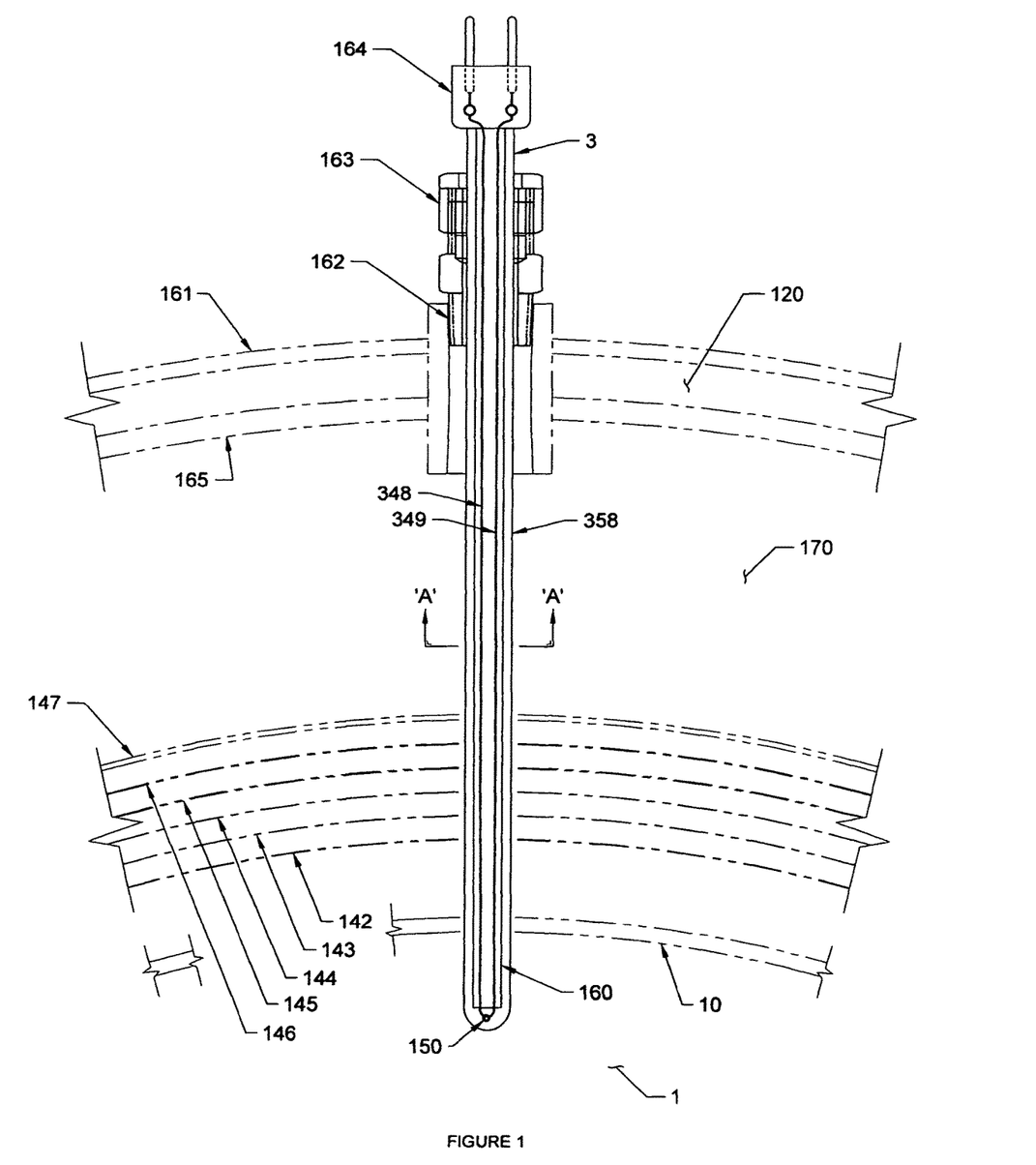
FIG. 1 is a cross-sectional view of the standard vacuum furnace Type S thermocouple utilized in most industrial vacuum furnaces, which is mounted in the upper chamber of a vacuum furnace wall and passes through the water-cooled chamber into the hot zone.

FIG. 1 shows a partial cross-section of a hot zone 1 in which a standard Type S thermocouple used in current vacuum furnaces of all sizes is depicted. A control thermocouple 3 is inserted into an outer cold wall 161 through a water-cooled annular space 120 and out of an inner cold wall 165. Control thermocouple 3 passes through an annular space 170 between an inner cold wall 165 and an outer ring 147 and shields 142, 143, 144, 145 and 146. Thermocouple 3 extends approximately three inches from a heating element 10 in order to provide an accurate temperature measurement inside hot zone 1. Thermocouple 3 is sealed for vacuum integrity by means of a threaded vacuum seal 162 which is connected to a vacuum gland 163, ensuring the connection is vacuum tight such that the furnace is free of air leakage into the vacuum chamber hot zone 1. Thermocouple 3 is electrically connected outside the furnace to the furnace control module (not shown) via a thermocouple plug 164.

Radiation heat shields 142-146 are attached to the steel support outer ring 147 so that they are spaced approximately 3/16 inches apart to provide a vacuum gap between the shields to reduce conductive heat loss. Shield 142 is preferably made of 0.025 inch-thick pure molybdenum or a molybdenum alloy sheet conducive to vacuum heat treating. Shields 143 and 144 are preferably 0.010 inch-thick molybdenum-based sheet, and the remaining radiation shields 145 and 146 are preferably 0.018 inch-thick 304 stainless steel. The entire shield package is connected to the stainless steel hot zone outer ring 147 which is preferably made of 0.090 inch-thick stainless steel. The combination of radiation heat shields 142-146, heating element 10, and hot zone outer ring 147 form cylindrical hot zone 1, which also contains a hearth (not shown) for placement of metal parts to be heat treated. Alternatively, layers 142-146 could be made of graphite rayon or pan felt blanket for the all-graphite hot zone.

Control thermocouple 3 in a standard all-metal vacuum furnace has a 5/16 inch outer ceramic sheath 358 made preferably from 99.999% alumina. Situated within sheath 358 is a second double bore ceramic sheath 357 that has two equally sized bores 359 and 360 (not shown) housing thermocouple wires 348 and 349, made preferably from 24-gauge platinum and platinum-rhodium (10%), respectively, and joined via a welded thermocouple junction 150. For a Type S control thermocouple, wires 348 and 349 are platinum and a platinum-rhodium (10%) wire combination. As previously discussed, the thermocouple as shown in FIG. 1 suffers from temperature uniformity issues when used in small furnaces having a heating element diameter of less than 36 inches. These temperature uniformity issues arise when comparing the furnace control temperature to the workload thermocouples during heating at the lower temperature ranges. Using the standard control thermocouple 3, temperature discrepancies occur on the workload thermocouples when the control thermocouple is set for temperatures of 1200° F. or lower. As discussed above, these temperature fluctuations result from the higher thermal conductivity of the alumina sheath 358 at these lower temperatures and result in unexpected conductive heat loss along the 5/16 inch pure alumina sheath at the lower temperature range. Since conductive heat loss is predominant at the lower temperatures, where radiation heat transfer is not yet the predominant form of heat transfer, these losses are significant in these types of furnaces. A solution to this problem is necessary to prevent non conformance in heat treat operations at the low temperature range of heat treat processing of aerospace and medical parts. The present invention, as described and claimed hereinafter, provides this solution.

Figure 2:
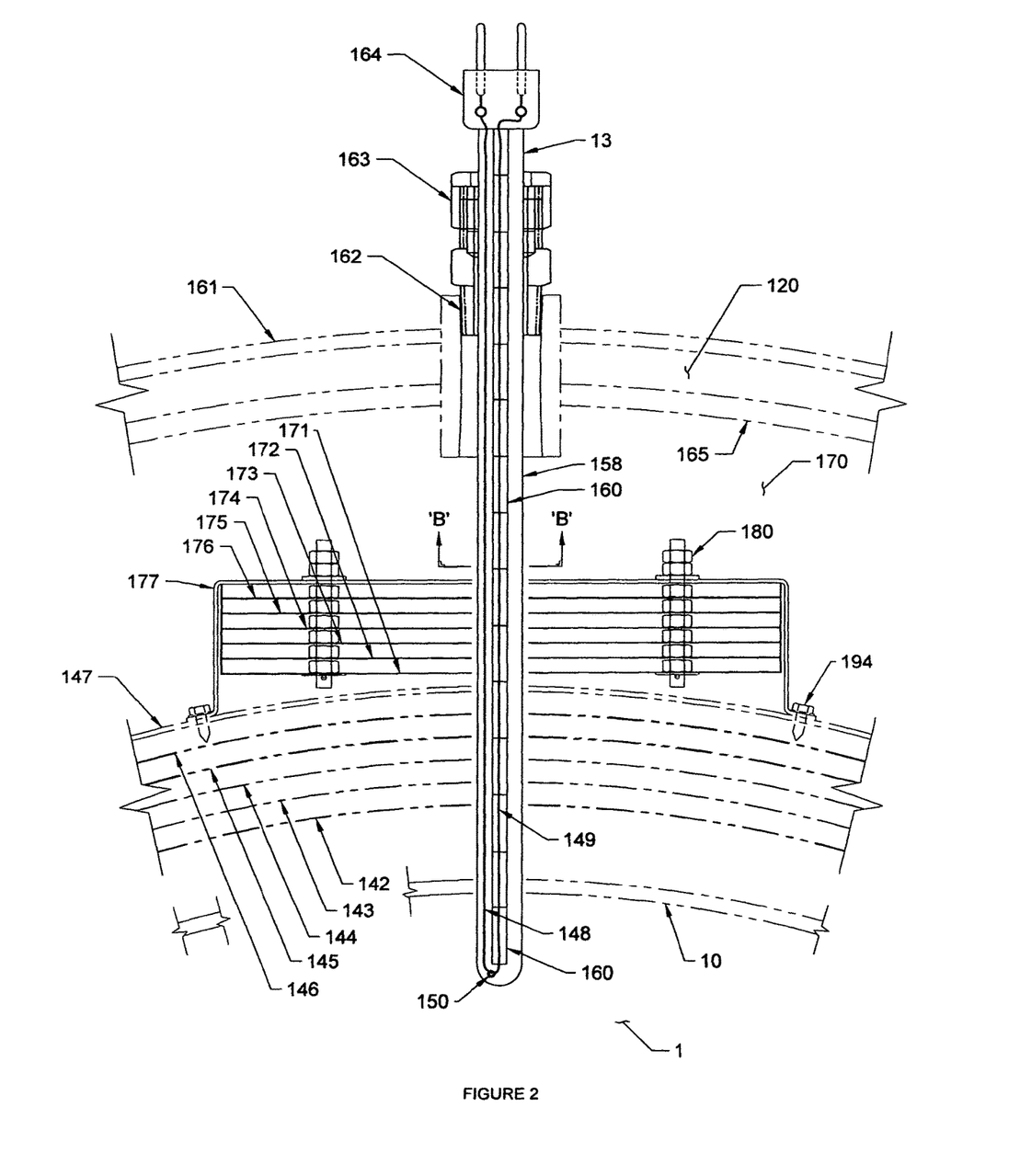
FIG. 2 is a cross-sectional view of a low density sheathed thermocouple according to the present invention mounted in the upper chamber of an all-metal vacuum furnace wall similar to FIG. 1.
Figure 3:
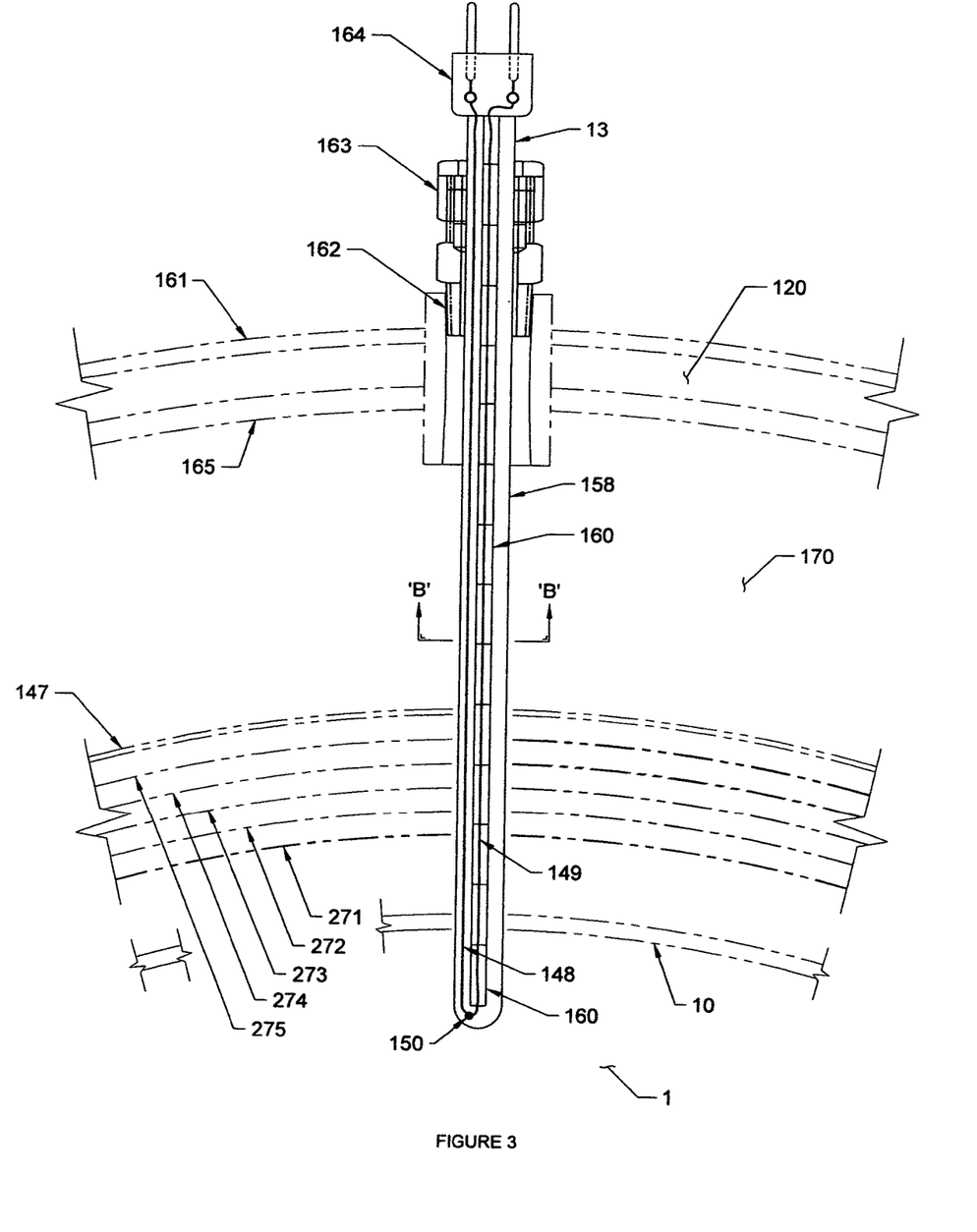
FIG. 3 is a cross-sectional view of the low density sheathed thermocouple shown in FIG. 2 in a graphite insulated vacuum furnace without the protective outer shield package shown in FIG. 2.

A new and improved thermocouple 13, according to the present invention, is shown in FIG. 2 and FIG. 3. Thermocouple 13 is shown in hot zone 1 similar to FIG. 1 in the case of the all-metal furnace. The all-metal hot zone 1 also includes reflection shields 171, 172, 173, 174, 175 and 176 connected together to form a single unit which is attached via a stainless steel cage or housing 177 to outer ring 147 by a pair of bolts 194. Changes have been made to the outside of stainless steel ring 147 in annular space 170 by the addition of the reflection shields 171-176, made preferably of molybdenum or stainless steel, whose preferred thickness is approximately 0.015 inches separated by nuts 180 and held in place by stainless steel housing 177. This additional thermocouple shielding package 171-176 has two purposes. It reflects any heat that is lost via radiation, and it increases the effective length of thermocouple 13, thereby decreasing conductive heat loss along outer alumina sheath 158 since the l length between the hot tip and the cooler tip is increased. This reduces the value of $Q_c$ in Equation 1 above. The radiation shield package 171-176 also reduces radiation losses that may result from radiation leakage at the aperture of insertion to the metal shield package 142-146 and hot zone ring 147. This portion of the present invention also results in a significant improvement at the higher temperatures (greater than 1000° F.), where radiation losses are high, thus providing an additional benefit at the high temperature end of the small furnaces with heating element diameters of 36 inches or less.

In FIG. 2 thermocouple 13 has an outer ceramic sheath 158 with its outside diameter decreased from 5/16 inch to 3/16 inch. This change reduces the overall surface area A in Equation 1 of the outer sheath, which substantially reduces the conductive heat losses at temperatures below 1000° F. In contrast to the standard Type S thermocouple design shown in FIG. 1, the present invention includes a series of short single bore ceramic tubes 160 (shown in FIG. 4) within alumina sheath 158 in which only one of the thermocouple wires 149 is placed inside tube 160. The second wire 148 is threaded within sheath 158 without any other ceramic protection. Therefore, one wire (platinum 24 gauge wire 148) is exposed within sheath 158, and the other wire (platinum/rhodium (10%) 24 gauge wire 149) is protected by a single bore 0.026 inch inner ceramic tube 160 (shown in FIG. 4). Alternatively, single bore inner tube 160 can be one long continuous piece rather than a series of stacked 1 inch long tubes as shown in FIGS. 2 and 3. The use of stacked 1 inch tubes leaves air gaps in inner tube 160 that helps reduce conductive losses from tube 160 to the water-cooled outer connection of thermocouple 13. Like thermocouple 3 in FIG. 1, thermocouple wires 148 and 149 are welded together in thermocouple 13 at junction 150 to complete the connection. It should be understood that thermocouple wires 148 and 149 could be made from any Type R material similar to platinum 24 gauge or platinum-rhodium (10%) 24 gauge.

FIG. 3 shows the same thermocouple 13 as in FIG. 2, for use in an all-graphite hot zone. Like numerals in FIG. 3 refer to the same elements as shown and described in FIG. 2. However, in FIG. 3 there are graphite felt blanket insulation layers 271, 272, 273, 274 and 275 that replace the metallic radiation shields 142-146 in FIG. 2. Hot zone graphite felt layers 271-275 are made preferably from rayon or pan graphite felt, surrounded on the interior of the hot zone by either graphite foil or board (not shown) and serve the purpose of insulating the hot zone to prevent radiative conductive heat loss. As previously discussed, thermocouple 13 alone is considered to be adequate in similarly sized all-graphite hot zone vacuum furnaces to avoid excessive temperature differences between the control thermocouple and the workload thermocouples in order to meet aerospace and medical heat treating specifications.

FIG. 4 shows the end view, cross-sectional view of the standard Type S thermocouple shown in FIG. 1 in view "A"-"A", and the thermocouple according to the present invention shown in FIGS. 2 and 3 in view "B"-"B". In view "A"-"A" the standard Type S thermocouple is shown having a 5/16 inch outside diameter alumina sheath 358 with the inner double bore alumina sheath 357 having openings 359 and 360 with 24-gauge platinum wire 348 and 24-gauge platinum/rhodium (10%) outside diameter wire 349, respectively, therein. From this cross-sectional view it is apparent that the surface area of alumina and the mass density is greater for the standard Type S control thermocouple 3 in view "A"-"A". In contrast view "B"-"B" shows a similar cross-sectional view of the thermocouple 13 according to the present invention. This view shows the 3/16 inch outside diameter alumina sheath 158 with the smaller single bore alumina internal sheath 160 that contains platinum/rhodium (10%) wire 149, and shows the platinum wire 148 unprotected in the outer alumina sheath 158. It should be understood that thermocouple wires 348 and 349 can be made from any material similar to platinum 24 gauge or platinum/rhodium (10%) 24 gauge.

As discussed above, view "A"-"A" shows a cross-section of the standard Type S thermocouple design having the inner double bore sheath 357 with wires 34 and 349 separated by bores 359 and 360, thereby keeping the wires from contact along the length of thermocouple 3 so that the only connection point is junction 150, as shown in FIG. 1. The use of the 5/16 inch outer bore 358 with the inner bore 357 provides a substantial mass of alumina and surface area which plays a key role in conductive heat transfer between the hot tip and the section of thermocouple 3 in the annular space 170 that is connected to cold wall 165. From view "B"-"B" the surface area of alumina and the mass density is seen as being decreased compared to view "A"-"A", resulting in a smaller value of Q in Equation 1, and thus producing a decrease in the conductive losses at the lower furnace temperatures in the above-described furnaces. Therefore, an increase in L in Equation 1 results in a significant improvement of the accuracy of the furnace temperature in conjunction with the workload temperatures during the heat treat process. This improvement allows for better non-human control of the heat treat process, as the two types of thermocouples fall within the required temperature ranges required by aerospace and medical parts suppliers.

Example 1: Old Style Type S Thermocouple

The standard furnace thermocouple design for a furnace with a heating element diameter of 36 inches and a longitudinal length of 24 inches was used. A uniformity survey was completed according to AMS 2750E. Work thermocouples were embedded in the parts being heat treated as in any normal run. In each case the furnace was set to the temperature listed in Table 1 below. The temperature difference between the standard Type S control thermocouple and the Type K or Type N thermocouples, used routinely as work thermocouples, was recorded after the furnace temperature had reached equilibrium over a period of 15 minutes. The large discrepancies between 1000° F. and 1200° F. caused the furnace to fall out of compliance for aerospace and medical applications, resulting in non-conformance reporting, possible damage to the parts and an economic loss to both the heat treat company and the parts manufacturer.

TABLE 1

| Control TC Set Point | Survey TC Range |
|---|---|
| 1000° F. | +46 to +43° F. |
| 1200° F. | +22 to +17° F. |
| 1500° F. | +4 to +1° F. |
| 2100° F. | +3 to +1° F. |

Example 2: New Thermocouple According to Present Invention

The two distinguishing features of the present invention were added—the shielding package with up to four shields and the thinner 3/16 inch-thick thermocouple design of FIG. 2. In each heat treat process the temperature was set to the temperature listed in Table 1, and the temperature difference between the standard Type S thermocouple and the Type K or Type N thermocouples, used routinely as work thermocouples, was recorded after the furnace temperature had reached equilibrium over a period of 15 minutes. The temperature discrepancies for each temperature range between 1000° F. and 2100° F. are listed in Table 2 below. The use of the thermocouple according to the present invention transformed a furnace that could not meet the uniformity survey for use in the aerospace and medical parts industries, and corrected the offset to acceptable levels allowing this smaller size furnace to become accredited for use in these industries.

TABLE 2

| Control TC Set Point | Survey TC Range |
|---|---|
| 1000° F. | +4 to +0° F. |
| 1200° F. | +2 to ¬1° F. |
| 1500° F. | 0 to ¬3° F. |
| 2100° F. | 0 to ¬3° F. |

While there has been described what is believed to be a preferred embodiment of the present invention, those skilled in the art will recognize that other and further modifications may be made thereto without departing from the spirit and scope of the invention. It is therefore intended to claim all such embodiments that fall within the true scope of the invention.

What is claimed is:

1. In a cold wall vacuum furnace hot zone with a heating element diameter of 36 inches or less and operating at temperatures of 649"C or less for heat treating metal parts, a control thermocouple assembly for measuring the temperature in the hot zone comprising:
   continuous sheath having an elongated longitudinal axis and a measuring tip located along said elongated longitudinal axis at a distal end of said sheath;
   said sheath having an outside diameter of no more than 3/16 inch and being made from a ceramic material;
   said sheath having an inner single bore ceramic tube comprised of a series of stacked tubes having air gaps therebetween located one on top of another within said sheath,
   said sheath containing a first thermocouple wire therein and the series of stacked tubes having a single bore containing a second thermocouple wire therein, said first and second thermocouple wires being separated from each other within said sheath, and being joined together at the longitudinal tip of said sheath to form a thermocouple junction therebetween; and a reflection shield being operatively connected to an outer face of the furnace hot zone and located in proximity to said thermocouple assembly sheath.

2. The control thermocouple assembly according to claim 1 wherein said ceramic material of said sheath is alumina.

3. The control thermocouple assembly according to claim 1 wherein said ceramic material of said sheath is made of any high temperature ceramic material.

4. The control thermocouple assembly according to claim 1 wherein said reflection shield comprises a series of reflection shields connected together within a housing to form a single unit, said housing being operatively connected to the outer face of the furnace hot zone.

5. The control thermocouple assembly according to claim 4 wherein said reflection shields are made of molybdenum.

6. The control thermocouple assembly according to claim 4 wherein said reflection shields are made of stainless steel.

7. The control thermocouple assembly according to claim 4 wherein said reflection shields are approximately 0.015 inches thick.

8. The control thermocouple assembly according to claim 4 wherein each of said reflection shields are separated by approximately 1/16 inch or greater.

9. The control thermocouple assembly according to claim 1 wherein said first thermocouple wire is made from platinum 24 gauge (Type S).

10. The control thermocouple assembly according to claim 1 wherein said second thermocouple wire is made from platinum/rhodium (10%) 24 gauge (Type S).

11. The control thermocouple assembly according to claim 1 wherein said first and second thermocouple wires are made from any material similar to platinum 24 gauge or platinum/rhodium (10%) 24 gauge (Type R).

* * * * *